United States Patent [19]
Pisani

[11] Patent Number: 5,931,773
[45] Date of Patent: Aug. 3, 1999

[54] METHOD FOR TREATMENT OF SOLID WASTE TO MINIMIZE PERMEABILITY OF THE WASTE

[75] Inventor: Philip J. Pisani, Irving, Tex.

[73] Assignee: Entact, Inc., Irving, Tex.

[21] Appl. No.: 08/867,585

[22] Filed: Jun. 2, 1997

Related U.S. Application Data

[63] Continuation-in-part of application No. 08/617,481, Mar. 15, 1996, Pat. No. 5,788,623, which is a continuation-in-part of application No. 08/488,946, Jun. 9, 1995, Pat. No. 5,591,116.

[51] Int. Cl.⁶ .................................. A62D 3/00; B09B 3/00
[52] U.S. Cl. .......................... 588/256; 405/128; 588/901
[58] Field of Search ................................... 588/252, 256, 588/257, 901; 405/128, 129

[56] References Cited

U.S. PATENT DOCUMENTS

| | | | |
|---|---|---|---|
| 4,518,508 | 5/1985 | Conner | 588/256 X |
| 4,737,356 | 4/1988 | O'Hara et al. | 588/256 |
| 4,889,640 | 12/1989 | Stanforth | 405/129 |
| 4,950,409 | 8/1990 | Stanforth | 405/129 |
| 5,162,600 | 11/1992 | Cody et al. | 588/256 X |
| 5,202,033 | 4/1993 | Stanforth et al. | 588/256 X |
| 5,512,702 | 4/1996 | Ryan et al. | 588/256 |
| 5,527,982 | 6/1996 | Pal et al. | 588/256 |
| 5,536,899 | 7/1996 | Forrester | 588/256 |
| 5,569,155 | 10/1996 | Pal et al. | 588/256 |
| 5,591,116 | 1/1997 | Pierce | 588/256 |

*Primary Examiner*—George Suchfield
*Attorney, Agent, or Firm*—Gardere & Wynne, L.L.P.

[57] ABSTRACT

This invention relates to the treatment of contaminated materials including soils and solids to reduce its permeability, and in particular to chemical treatment of waste or solids containing high levels of heavy metals such as lead, by treating the waste or solid with a single additive or combination of additives including calcium carbonate; reactive magnesium carbonate; reactive calcium magnesium carbonate; magnesium oxide; magnesium hydroxide; ammonium phosphate; diammonium phosphate; phosphoric acid; boric acid; metallic iron; polyphosphoric acid; sodium carbonate; sodium bicarbonate; calcium oxide; calcium hydroxide; sodium hydrogen phosphate; triple super phosphate (TSP); superphosphate; polyphosphoric acid; phosphoric acids; salts of phosphoric acids; $P_2O_5$; phosphate rock; monoammonium phosphate; disodium hydrogen phosphate; trisodium phosphate; water soluble phosphate; Fe(II); Fe(III); Al(III); chloride; $Fe(NO_3)_3$; $FeSO_4$; $Fe_2(SO_4)_3$; $FeCl_3$; $Al_2(SO_4)_3$; $Al_2O_3$; aluminosilicate; calcium sulfate; gypsum; sulfuric acid; alum; trisodium phosphate; potassium phosphate; monobasic, dibasic and tribasic calcium phosphates; lime; halites; sulphates of iron; sulphates of aluminum; pyrophosphates and potassium phosphates.

22 Claims, No Drawings

METHOD FOR TREATMENT OF SOLID WASTE TO MINIMIZE PERMEABILITY OF THE WASTE

RELATED APPLICATION

This is a Continuation-in-part of a prior-filed Application entitled "Method for Treatment of Solid Waste to Minimize Permeability of the Waste" filed Mar. 15, 1996 having Ser. No. 08/617,481,which issued as U.S. Pat. No. 5,788,623 on Aug. 4, 1998, which is a Continuation-in-part of prior filed application entitled "Method for Treatment of Solid Waste to Minimize Permeability of the Waste" filed Jun. 9, 1995 having Ser. No. 08/488,946 and which issued as U.S. Pat. No. 5,591,116 on Jan. 7, 1997.

TECHNICAL FIELD

This invention relates to the treatment of contaminated materials, including soils and solids, and in particular to the physical and chemical treatment of waste or solids containing high levels of heavy metals, and in particular, lead, by decreasing the permeability of the solid waste to control leaching of the heavy metals such that the metals will not leach at unacceptable levels into ground water under naturally occurring conditions.

BACKGROUND OF THE INVENTION

Over the past fifteen to twenty years, the potential dangers of hazardous waste, and in particular, heavy metals such as lead, arsenic, chromium, copper and cadmium, have been the subject of community pressure, public awareness and ever stricter regulatory control in order to reduce or eliminate the dangers to people directly and to the surrounding environment.

The leaching of heavy metals, and lead particularly, into ground water is a grave concern because of the danger that the drinking water supplies and the environment will become contaminated.

Solid wastes are classified as hazardous by the United States Environmental Protection Agency (U.S. EPA) pursuant to 40 C.F.R., Part 261. Any solid waste can be defined as hazardous either because it is "listed" in 40 C.F.R., Part 261 Subpart D or because it exhibits one or more of the characteristics of a hazardous waste as defined at Part 261, Subpart C. These characteristics are: (1) ignitability, (2) corrosivity, (3) reactivity, and (4) toxicity.

40 C.F.R., Part 261.24(a), contains a list of contaminants and their associated maximum allowable concentrations. If a contaminant, such as lead, exceeds its maximum allowable concentration, when tested using the TCLP analysis as specified at 40 C.F.R. Part 261 Appendix 2, then the material is classified as hazardous. Waste containing leachable lead (Pb) is currently classified as hazardous waste due to the toxicity characteristic, if the level of lead extracted in a TCLP analysis is above 5.0 milligrams per liter (mg/L) or parts per millions (ppm).

Additionally, U.S. EPA land disposal restrictions prohibit the land disposal of solid wastes which leach in excess of these maximum allowable concentrations upon performance of the TCLP analysis. The land disposal regulations require that these wastes are treated until the heavy metals do not leach from the solid waste at levels above the maximum allowable concentrations prior to placement in a surface impoundment, waste pile, landfill or other land disposal unit as defined in 40 C.F.R. 260.10.

In addition, various states also have promulgated regulations which place special disposal requirements on solid waste which do not leach at concentrations that exceed the TC criteria but do leach above certain other criteria. For example, the State of Texas classifies solid wastes which leach lead between 1.5 mg/L and 5.0 mg/L under the TCLP analysis as a non-hazardous, Class 1 solid waste. Special disposal requirements are placed on these wastes which are more costly than if the TCLP results are less than the 1.5 mg/L. Therefore, the goal of solid waste treatment is often to obtain leaching results much lower than the hazardous criteria of 5.0 mg/L.

The TCLP test is designed to simulate a worst case leaching situation, that is leaching conditions which would typically be found in the interior of an actively degrading municipal landfill. Such landfills normally are slightly acidic with a pH of approximately 5±0.5. Additionally, the leaching medium is normally heavily buffered by volatile organic acids, for example acetic acid produced by the facultative anaerobic degradation of organic matter. Currently, Applicant's pending patent application Ser. No. 08/726,622, filed Oct. 7, 1996 and which issued as U.S. Pat. No. 5,674,176 on Oct. 7, 1997, covers treatment to reduce the toxicity of a waste as measured by the TCLP test.

In addition to the TCLP leachate test requirements, structural design and regulatory requirements often place physical criteria on treated waste. The U.S. EPA has adopted 50 pounds/square inch, measured as unconfined compressive strength, as its general guidance for structural criteria to support a landfill cap.

Importantly, if the treated waste is placed in a saturated or potentially saturated condition, a permeability specification may also be placed on the treatment design. For example, the State of Florida has imposed a maximum permeability criteria of $1 \times 10^{-6}$ cm/s on waste disposed of in subsurface saturated conditions. If the metal containing waste has a significant amount of sand or organic matter, then additives will be needed to obtain the required structural integrity. Under actual disposal conditions, reductions in permeability will reduce percolation of surface and ground water into water tables carrying leachable heavy metals, and in particular lead.

The present invention provides a method of reducing the permeability of the solid waste and, thus, reducing the leachability of certain heavy metals.

Unlike the present invention, prior art additives and mixtures have focused only on reducing the leachability of the metals without regard to permeability standards or characteristics. The present invention reduces the permeability of the solid waste and thereby also reduces the leachability of heavy metals, and in particular lead.

U.S. Pat. No. 5,591,116 which was assigned to the assignee of the present application and which is hereby incorporated by reference, teaches the combination of additives and Portland Cement to reduce the leachability of heavy metals and in particular lead.

U.S. Pat. No. 5,202,033 describes an in-situ method for decreasing heavy metal leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of leachable metals such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture for treating hazardous waste, including lead, by mixing the solid waste with an agent selected from the group consisting of reactive calcium carbonate, reactive magnesium carbonate and reactive calcium magnesium carbonate.

U.S. Pat. No. 4,652,381 discloses a process for treating industrial waste water contaminated with battery plant waste, such as sulfuric acid and heavy metals by treating the waste water with calcium carbonate, calcium sulfate, calcium hydroxide to complete a separation of the heavy metals. However, this is not for use in a landfill situation.

U.S. Pat. No. 5,536,899 discloses a method for reducing the leaching of lead from lead bearing waste by contacting the waste with a water soluble phosphate and a complexing agent, whereby a lead product is formed that is less soluble than the lead originally in the waste, thereby reducing the leachability of lead from the waste.

U.S. Pat. No. 5,527,982 discloses a method for treating lead bearing materials or lead waste which chemically converts leachable lead into a non-leachable form by mixing the material with lime, gypsum and/or phosphoric acid.

U.S. Pat. No. 5,193,936 discloses a two step treatment process for lead-toxic wastes to fixate and stabilize leachable lead contained therein, which employs the use of a sulphate compound, such as gypsum, in a first step, and a phosphate reagent, such as phosphoric acid, in a second step.

Unlike the present invention, however, none of the prior art solutions were able to utilize the waste itself in combination with a single additive or multiple additives to reduce the permeability of the solid waste and thereby further reduce its leachability and mobility.

SUMMARY OF THE INVENTION

Treatment of solid waste for reducing its permeability and thus reducing the leachability and mobility of metals may be accomplished by the sorting and distribution of waste and naturally occurring materials such that the resulting material exhibits maximum compaction characteristics. In particular, the addition of a substance(s) which complements the particle size distribution and compaction characteristics of the waste material helps to obtain maximum compaction.

The present invention discloses a treatment through a system of particle size reduction, sorting, mixing and the addition of an additive substance, either alone or in association with other additives, which is properly chosen to complement the waste constituency and therefore, provide the appropriate compaction characteristics to meet the permeability criteria. The present invention involves the treatment of hazardous and solid waste by the addition and mixing of treatment additives chosen and tailored with consideration given to the chemical and physical regulatory criteria, soil and groundwater chemistry of the disposal site, and the physical and mineral characteristics of the waste itself.

Indeed, the present invention provides a method for the treatment of solid waste by reducing its permeability. The waste may be treated by one or more of the following agents alone or in combination: calcium carbonate; reactive magnesium carbonate; reactive calcium magnesium carbonate; magnesium oxide; magnesium hydroxide; ammonium phosphate; diammonium phosphate; phosphoric acid; boric acid; metallic iron; polyphosphoric acid; sodium carbonate; sodium bicarbonate; calcium oxide; calcium hydroxide; sodium hydrogen phosphate; triple super phosphate (TSP); superphosphate; polyphosphoric acid; phosphoric acids; salts of phosphoric acids; $P_2O_5$; phosphate rock; monoammonium phosphate; disodium hydrogen phosphate; trisodium phosphate; water soluble phosphate; Fe(II); Fe(III); Al(III); chloride; $Fe(NO_3)_3$; $FeSO_4$; $Fe_2(SO_4)_3$; $FeCl_3$; $Al_2(SO_4)_3$; $Al_2O_3$; aluminosilicate; calcium sulfate; gypsum; sulfuric acid; alum; trisodium phosphate; potassium phosphate; monobasic, dibasic and tribasic calcium phosphates; lime; halites; sulphates of iron; sulphates of aluminum; pyrophosphates and potassium phosphates.

The above additives, either alone or in combination, provide the pH buffer system which provides stability so that additional additive(s) needed to enhance the physical characteristics do not upset the chemical equilibrium needed for the necessary pH balance.

DETAILED DESCRIPTION

The present invention involves the treatment of solid waste to reduce its permeability by the addition and mixing with a treatment additive chosen by considering (1) the chemical and physical regulatory criteria; (2) the soil and groundwater chemistry of the disposal site; and (3) the physical characteristics of the waste itself, i.e. particle size distribution, organic content and clay content.

Monocalcium phosphate, which is also commonly available in a fertilizer grade as triple super phosphate or TSP, may be used alone or with Portland Cement to treat the waste. If the waste material is a soil, does not contain much organic matter and has an adequate amount of clay, then monocalcium phosphate additive alone may prove adequate to meet the chemical and physical criteria. This additive would provide some fines to the system, i.e. particles which would pass a #200 sieve, and the phosphoric acid buffer system that provides stability to the treated waste mixture under minor environmental changes.

If the physical criteria, i.e. permeability and unconfined compressive strength, cannot be met with the phosphate additive alone, then Portland Cement can be added to provide the cementatious matrix which will increase unconfined compressive strength and decrease permeability. The phosphate buffer system provided by the monocalcium phosphate additive will stabilize the system up to a certain point of Portland Cement addition so that it will not offset the chemical equilibrium (Portland cement shifts the pH to the high end) and return the lead to a more soluble form.

Other additives, alone or in combination, such as, for example, calcium carbonate; reactive magnesium carbonate; reactive calcium magnesium carbonate; magnesium oxide; magnesium hydroxide; ammonium phosphate; diammonium phosphate; phosphoric acid; boric acid; metallic iron; polyphosphoric acid; sodium carbonate; sodium bicarbonate; calcium oxide; calcium hydroxide; sodium hydrogen phosphate; triple super phosphate (TSP); superphosphate; polyphosphoric acid; phosphoric acids; salts of phosphoric acids; $P_2O_5$; phosphate rock; monoammonium phosphate; disodium hydrogen phosphate; trisodium phosphate; water soluble phosphate; Fe (II); Fe (III); Al(III); chloride; $Fe(NO_3)_3$; $FeSO_4$; $Fe_2(SO_4)_3$; $FeCl_3$; $Al_2(SO_4)_3$; $Al_2O_3$; aluminosilicate; calcium sulfate; gypsum; sulfuric acid; alum; trisodium phosphate; potassium phosphate; monobasic, dibasic and tribasic calcium phosphates; lime; halites; sulphates of iron; sulphates of aluminum; pyrophosphates and potassium phosphates may also be used to reduce the permeability of the waste.

A buffer solution is one consisting of a weak acid and its conjugate base which resists pH changes when diluted or when various amounts of acid or base are added. Since orthophosphoric acid (hereinafter referred to as phosphoric acid), the root compound of the above-listed additives, is a polyprotic acid, it disassociates or ionizes in three steps involving the following-proton-transfer equilibria:

$$H_3PO_4 + H_2O = H_2PO_4^- + H_3O^+ \quad K_1 = 7.5 \times 10^{-3} \quad pK_1 = 2.1 \quad (1)$$

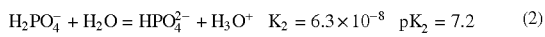

$$H_2PO_4^- + H_2O = HPO_4^{2-} + H_3O^+ \quad K_2 = 6.3 \times 10^{-8} \quad pK_2 = 7.2 \quad (2)$$

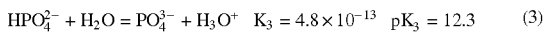

$$HPO_4^{2-} + H_2O = PO_4^{3-} + H_3O^+ \quad K_3 = 4.8 \times 10^{-13} \quad pK_3 = 12.3 \quad (3)$$

In each of these ionization steps, the substance on the left side of the reaction arrow is the weak acid and the substance on the right is the conjugate base. Therefore, three separate buffer systems are available by the addition of phosphoric acid or of its derivative salts in an aqueous solution.

The chemical equilibria shifts with pH and the addition of other chemical species. In a pure phosphoric acid solution, however, at a pH of 4.6, the $H_2PO_4^-$ species totally dominates. At a pH of 7.2, the equilibrium shifts to ½ $H_2PO_4^-$ and ½ $HPO_4^{2-}$ and at a pH of 9.8, the species $H_2PO_4^-$ dominates. The maximum buffer capacity exists at the pH where equal concentrations of each species exists, or the pK value is 2.1 for reaction (1), 7.2 for reaction (2) and 12.3 for reaction (3).

Lead is known to be soluble at lower and higher pH ranges, therefore, theoretically the optimum pH of a phosphoric acid solution with lead would be 7.2. The chemical equilibria of such a system, however, is subject to many additional factors; therefore, the optimum final pH shifts with every mixture.

Table 1 shows the compilation of permeability data obtained in a treatability study using samples of solid waste obtained from a waste site. Table 1 shows the successful treatment, by reducing the solid waste permeability, of lead contaminated solid waste by the addition of TSP either alone or in combination with the additive Portland Cement added for soil stability. The Portland Cement used is preferably as specified by ASTM C150.

In determining the soil physical and chemical characteristics and the proper additive for treatment of the solid waste, samples of the solid waste are used to perform the laboratory treatment tests.

For example, in practicing the invention, the mix of the solid waste with the pH buffering agents must be sufficiently complete so that a random small sample, e.g. 100 grams of the waste mixture, will have sufficient agents to limit lead extraction to below 5.0 mg/L when the waste mixture is analyzed using the TCLP. A compacted 3-inch diameter by 6" high cylinder is used to test whether sufficient agents have been added to limit the permeability to below $1 \times 10^{-6}$ cm/s when the waste mixture is analyzed using ASTM D 5084 specifications. In addition, the American Nuclear Society (ANS) Method 16.1 test has been modified for use in testing the leaching characteristics of solidified waste. The modified ANS 16.1 has been used in this application to ensure that the waste has an effective diffusivity of $\leq 1 \times 10^{-12}$ $CM^2/S$.

For a specific solid waste, the appropriate ratio of agents to solid waste may be arrived at by experimentation with the above noted amount of sample of the waste having various percentages of the agents by weight. In general the percentage by weight of the additive can range from 1% to 10% and the percentage by weight of the Portland Cement can range from 3% to 30%.

TABLE 1

| Sample ID | Permeability (cm/sec) |
|---|---|
| PP14-4A | $1.7 \times 10^{-8}$ |
| PP14-4B | $1.0 \times 10^{-8}$ |
| PP14-4C | $1.0 \times 10^{-8}$ |
| PP14-5A | $3.1 \times 10^{-8}$ |
| PP14-5B | $9.1 \times 10^{-7}$ |
| PP14-5C | $3.7 \times 10^{-8}$ |
| PP15-4A | $6.2 \times 10^{-9}$ |
| PP15-4B | $2.5 \times 10^{-8}$ |
| PP15-4C | $7.9 \times 10^{-9}$ |
| PP15-5A | $8.3 \times 10^{-9}$ |
| PP15-5B | $3.7 \times 10^{-8}$ |
| PP15-5C | $6.9 \times 10^{-9}$ |
| 4A | $1.1 \times 10^{-7}$ |
| 5A | $2.6 \times 10^{-9}$ |
| 6A | $5.2 \times 10^{-9}$ |
| 7A | $6.0 \times 10^{-9}$ |
| 9A | $1.2 \times 10^{-8}$ |

The data in Table 1 discloses that acceptable permeability coefficients were obtained, when tested in accordance with ASTM D 5084 specifications, when the solid waste is mixed with TSP alone or with TSP and Portland Cement. Each sample of solid waste was prepared for testing by drying and weighing the sample, by adding between 3.0 and 5.0 percent by dry weight of TSP to each sample, by adding between 12.0 and 15.0 percent by dry weight of Portland Cement to some of the samples, and by curing each of the samples in 100% humidity for at least seven days.

The treatability ratios of Table 1 disclose that agents of phosphoric acid such as TSP either alone or in combination with Portland Cement can be used to reduce permeability of solid waste below state imposed maximum criteria.

Other agents such as calcium carbonate; reactive magnesium carbonate; reactive calcium magnesium carbonate; magnesium oxide; magnesium hydroxide; ammonium phosphate; diammonium phosphate; phosphoric acid; boric acid; metallic iron; polyphosphoric acid; sodium carbonate; sodium bicarbonate; calcium oxide; calcium hydroxide; sodium hydrogen phosphate; triple super phosphate (TSP); superphosphate; polyphosphoric acid; phosphoric acids; salts of phosphoric acids; $P_2O_5$; phosphate rock; monoammonium phosphate; disodium hydrogen phosphate; trisodium phosphate; water soluble phosphate; Fe(II); Fe(III); Al(III); chloride; $Fe(NO_3)_3$; $FeSO_4$; $Fe_2(SO_4)_3$; $FeCl_3$; $Al_2(SO_4)_3$; $Al_2O_3$; aluminosilicate; calcium sulfate; gypsum; sulfuric acid; alum; trisodium phosphate; potassium phosphate; monobasic, dibasic and tribasic calcium phosphates; lime; halites; sulphates of iron; sulphates of aluminum; pyrophosphates and potassium phosphates can also be used to reduce the permeability of the solid waste below regulated maximum criteria.

It is understood that the invention is not confined to the particular process disclosed herein; nor to the materials and substances described, but embraces such modified forms thereof as come within the scope of the following claims.

What is claimed is:

1. A method for producing a non-hazardous solid waste mixture having a low permeability coefficient comprising mixing a solid hazardous waste with sufficient quantities of a first agent, a water soluble phosphate, and a second agent selected from the group consisting of [Fe(II), Fe(III), Al(III), chloride] $Fe(NO_3)_3$, $FeSO_4$, $Fe_2(SO_4)_3$, $FeCl_3$, $Al_2(SO_4)_3$, $Al_2O_3$, aluminosilicate or combinations thereof, so that under both acidic and non-acidic conditions the mixture will be substantially less permeable than the solid hazardous waste.

2. The method of claim 1 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-6}$ centimeters per second when analyzed in accordance with the ASTM D 5084 procedure.

3. The method of claim 1 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-4}$ centimeters per second when analyzed in accordance with the ASTM D 5084 procedure.

4. The method of claim 1 wherein the water soluble phosphate is selected from the group consisting of phosphoric acids, salts of phosphoric acids, $P_2O_5$, phosphate rock and combinations thereof.

5. The method of claim 4 wherein the salts of phosphoric acids are selected from the group consisting of monoammonium phosphate, diammonium phosphate, disodium hydrogen phosphate, trisodium phosphate and combinations thereof.

6. A non-hazardous solid waste mixture having a low permeability coefficient which may be safely disposed in a landfill comprising a solid hazardous waste mixed with sufficient quantities of a first agent, a water soluble phosphate, and a second agent selected from the group consisting of [Fe(II), Fe(III), Al(III), chloride] $Fe(NO_3)_3$, $FeSO_4$, $Fe_2(SO_4)_3$, $FeCl_3$, $Al_2(SO_4)_3$, $Al_2O_3$, aluminosilicate or combinations thereof, so that under conditions which support reaction between the agents and the solid waste, the mixture will be substantially less permeable than the solid hazardous waste.

7. The non-hazardous solid waste mixture of claim 6 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-6}$ centimeters per second.

8. The non-hazardous solid waste mixture of claim 6 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-4}$ centimeters per second.

9. A method for producing a non-hazardous solid waste mixture having a low permeability coefficient comprising mixing a solid hazardous waste with sufficient quantities of a first agent, a sulfate compound selected from the group consisting of calcium sulfate, gypsum, sulfuric acid and alum, and a second agent, phosphate selected from the group consisting of phosphoric acid, trisodium phosphate, a potassium phosphate and monobasic, dibasic and tribasic calcium phosphates, so that under both acidic and non-acidic conditions the mixture will be substantially less permeable than the solid hazardous waste.

10. The method of claim 9 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-6}$ centimeters per second when analyzed in accordance with the ASTM D 5084 procedure.

11. The method of claim 9 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-4}$ centimeters per second when analyzed in accordance with the ASTM D 5084 procedure.

12. A non-hazardous solid waste mixture having a low permeability coefficient which may be safely disposed in a landfill comprising a solid hazardous waste mixed with sufficient quantities of a first agent, a sulfate compound selected from the group consisting of calcium sulfate, gypsum, sulfuric acid and alum, and a second agent, phosphate selected from the group consisting of phosphoric acid, trisodium phosphate, a potassium phosphate and monobasic, dibasic and tribasic calcium phosphates, so that under conditions which support reaction between the agents and the solid waste, the mixture will be substantially less permeable than the solid hazardous waste.

13. The non-hazardous solid waste mixture of claim 12 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-6}$ centimeters per second.

14. The non-hazardous solid waste mixture of claim 12 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-4}$ centimeters per second.

15. A method for producing a non-hazardous solid waste mixture having a low permeability coefficient comprising mixing a solid hazardous waste with sufficient quantities of a first agent selected from the group consisting of sulphates, and silicates, and a second agent selected from the group consisting of phosphoric acid, trisodium phosphate, triple super phosphate (TSP), pyrophosphates, potassium phosphates and ammonium phosphates, so that under both acidic and non-acidic conditions the mixture will be substantially less permeable than the solid hazardous waste.

16. A method of claim 15 wherein the first agent is selected from the group consisting of gypsum, lime, alum, sulphates of iron, and sulphates of aluminum.

17. The method of claim 15 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-6}$ centimeters per second when analyzed in accordance with the ASTM D 5084 procedure.

18. The method of claim 15 wherein the solid hazardous waste and the agents are mixed together with sufficient quantities of the agents so that a random sample of the mixture compacted into a 3 inch diameter by 6 inch long cylinder will have sufficient agents to reduce the permeability below $1\times10^{-4}$ centimeters per second when analyzed in accordance with the ASTM D 5084 procedure.

19. A non-hazardous solid waste mixture having a low permeability coefficient which may be safely disposed in a landfill comprising a solid hazardous waste mixed with sufficient quantities of a first agent selected from the group consisting of sulphates, and silicates, and a second agent selected from the group consisting of phosphoric acid, trisodium phosphate, triple super phosphate (TSP), pyrophosphates, potassium phosphates and ammonium phosphates, so that under conditions which support reaction between the agent and the solid waste, the mixture will be substantially less permeable than the solid hazardous waste.

20. The non-hazardous solid waste mixture of claim 19 wherein the first agent is selected from the group consisting of gypsum, lime, alum, sulphates of iron, and sulphates of aluminum.

21. The non-hazardous solid waste mixture of claim 19 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-6}$ centimeters per second.

22. The non-hazardous solid waste mixture of claim 19 wherein the mixture contains sufficient quantities of the agents so that when a random sample consisting of a 3 inch diameter by 6 inch long cylinder of the mixture is analyzed in accordance with the ASTM D 5084 procedure the permeability is below $1\times10^{-4}$ centimeters per second.

* * * * *